Feb. 7, 1939.  L. DORÉ  2,146,204
FLUID DISTRIBUTING SYSTEM
Filed April 20, 1938   3 Sheets-Sheet 1

INVENTOR
L. DORÉ
BY J.D. O'Connell
ATTORNEY

Feb. 7, 1939.                L. DORÉ                 2,146,204
                    FLUID DISTRIBUTING SYSTEM
                     Filed April 20, 1938          3 Sheets-Sheet 3

INVENTOR
L. DORÉ
BY J. D. O'Connell
ATTORNEY

Patented Feb. 7, 1939

2,146,204

UNITED STATES PATENT OFFICE 2,146,204

FLUID DISTRIBUTING SYSTEM

Lucien Doré, Montreal, Quebec, Canada, assignor to Francis Hankin & Co. Limited, Montreal, Quebec, Canada Application April 20, 1938, Serial No. 203,110
In Canada November 5, 1937

8 Claims. (Cl. 137—34.2)

This invention relates to fluid distributing systems; and it comprises a system wherein automatic pressure equalizing drain valves are installed to prevent back leakage of contaminated water into city mains at points where connections are made between the mains and the service pipes of a building, industrial plant or the like.

It is customary to provide check valves in feed lines connecting city water mains with the service pipes of buildings, industrial plants, etc. but this does not give adequate protection against contamination of the city water since back leakage is apt to occur as the result of some defect in the valves. Such back leakage is particularly dangerous in cases where city mains are connected to service pipes which are also supplied with contaminated water drawn directly from a canal, river or similar source.

According to the present invention each feeder supplying city water to the service pipes is equipped with an automatic drain valve through which contaminated water entering the feeder from the service pipes is drained off before it has a chance to enter the city main. In a preferred embodiment of the invention the feeder is provided with two suitably spaced check valves arranged to open when the pressure on the upstream sides of the valves exceeds the downstream pressure and to close when these conditions are reversed. The portion of the feeder lying between the two check valves is connected to drain through a pressure responsive drain valve which opens automatically whenever the pressure between the check valves and that portion of the feeder which lies between the check valves and the city main is at zero value, said valve also opening automatically whenever the fluid pressure between the check valves exceeds the fluid pressure in that portion of the feeder which lies between the main and the nearest check valve. The drain valve is normally biased to open position by biasing means which permits said valve to close automatically in response to establishment of a definite fluid pressure between the check valves and in that portion of the conduit which lies between the main and the nearest check valve. With this arrangement an increase of fluid pressure between the check valves, due to back leakage of contaminated water from the service pipes, results in opening the drain valve so that the contaminated water is drained from the space between the check valve before it has an opportunity to pass into the city main.

Proceeding now to a more detailed description of this invention reference will be had to the accompanying drawings, in which—

Figure 1:
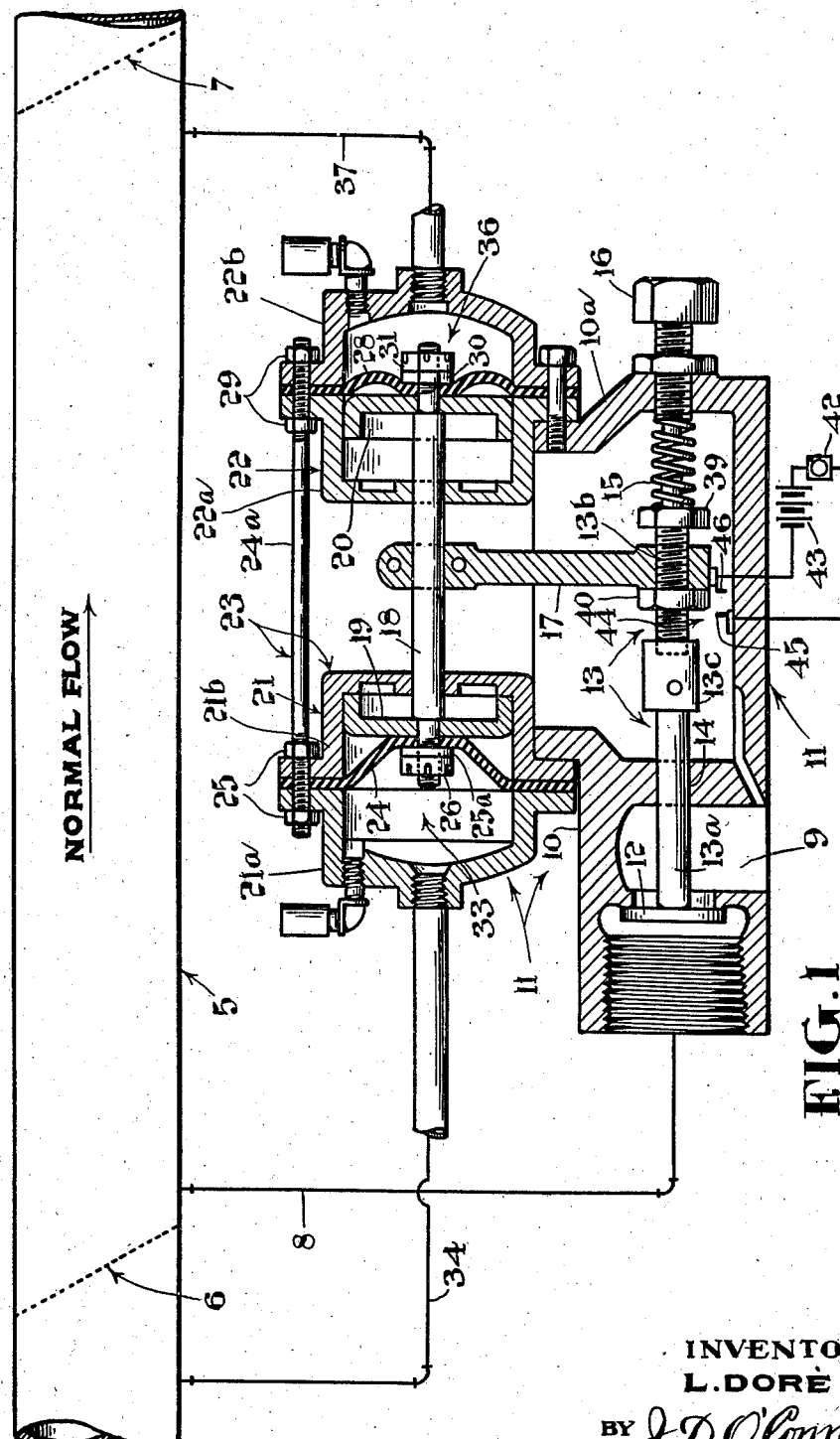
Figure 1 is a diagrammatic view showing the manner in which the check valves and automatic drain valve provided in accordance with this invention are associated with a feeder through which city water is supplied to the service pipes of a building, industrial plant or the like. In this view the automatic drain valve is shown in longitudinal section.

Referring more particularly to Fig. 1 of the drawings, 5 designates a feeder through which water is supplied from a city main to the service pipes of a building, industrial plant or the like, the normal direction of flow through the feeder being indicated by the applied arrow. The feeder is equipped with two suitably spaced check valves diagrammatically indicated at 6 and 7. That portion of the feeder which lies between the two check valves is connected, by pipe 8, to a drain passage 9 provided in the valve casing 10 of a pressure equalizing drain valve generally indicated at 11. The drain passage 9 is controlled by a disc valve 12 fixed to one end of a valve stem 13 slidably mounted in a suitable bearing 14. Stem 13 is normally biased to a valve opening position by a spring 15 confined between the free end of the stem and an adjusting screw 16 threaded through a suitable opening formed in the wall 10a of the valve casing. Stem 13 is connected by arm 17 and piston rod 18 to pistons 19 and 20 working in cylinders 21 and 22 forming part of a superstructure 23 mounted on valve casing 10.

Cylinder 21 contains a diaphragm 24 having its peripheral portion clamped between the cylinder sections 21a and 21b by bolt 24a and nuts 25 and its central portion clamped to piston 19 by washer 25a and nuts 26. Cylinder 22 contains a similar diaphragm 28 having its peripheral portion clamped between the cylinder sections 22a and 22b by bolt 24a and nuts 29 and its central portion clamped to piston 20 by the washer 30 and nut 31. A valve closing pressure chamber 33 is formed in cylinder 21 by the diaphragm 24. This chamber is connected to the feeder 5, at the upstream side of check valve 6, by a suitable pipe connection 34. A valve closing pressure chamber 36 is formed in cylinder 22 by diaphragm 28 and is connected, by pipe 37, to that portion of the feeder which lies between the valves 6 and 7, the connection between the feeder and pipe 37 being preferably located adjacent the upstream side of the valve 7.

In describing the operation of the automatic drain valve 11 it will be assumed that the downstream side of check valve 7 is subjected to a fluid pressure of 75 lbs. per square inch and that the pressure in the feeder at the upstream side of both valves 6 and 7 is zero. Under these conditions the pressure in the valve operating chambers 33 and 36 will be equalized at zero and the spring 15 is effective to move the drain valve 12 to open position. If a leak occurs in check valve 7 under these conditions the contaminated water entering the portion of the conduit lying between the two check valves will be drained off through the line 8 and drain passage 9. The valve 12 will also be biased to open position by the spring 15 when the pressure in the feeder at both the upstream and downstream sides of the two check valves is zero, a condition which obtains when there is no water in the feeder. Assuming that the downstream side of check valve 7 is subjected to a pressure of 75 lbs. per square inch and that the upstream sides of both check valves are subjected to a pressure of 70 lbs. per square inch, the pressure in chambers 33 and 66 will be equalized at 70 lbs. and the pressure acting on valve 12 through pipe 8 will be effective to hold the valve closed against the pressure of spring 15. Under these conditions any increase in the pressure between the two check valves due to back leakage past valve 7 will act through line 37 to open valve 12. As soon as the pressure in chambers 33 and 36 is again equalized by drainage through line 8 and drain passage 9, the valve 12 will close since the closing pressure applied to the face of the valve through line 8 will overcome the opening pressure of spring 15 when pressure conditions are equalized in chambers 33 and 36.

The valve stem 13 preferably comprises two sections 13a and 13b joined together by a suitable coupling 13c. Section 13b is threaded through the lower end of arm 17 and has one end engaged in a threaded socket formed in the coupling 13c. The opposite end of section 13b is reduced to form a supporting pin for one end of spring 15 and carries a spring abutment in the form of a nut 39. A second nut 40 is arranged on section 13b to lock the arm 17 in any desired position along the length of said section.

A warning signal is preferably arranged to operate when the valve 12 is opened by arm 17 so that the attendant will be advised of the fact that check valve 7 is leaking. By way of example, I have shown an alarm bell 42 in circuit with a battery 43 and a switch 44, the latter comprising two normally separated contacts including a stationary contact 45 in casing 18 adapted to be engaged by a movable contact 46 on the arm 17 when the latter is moved to its valve opening position.

Figure 2:
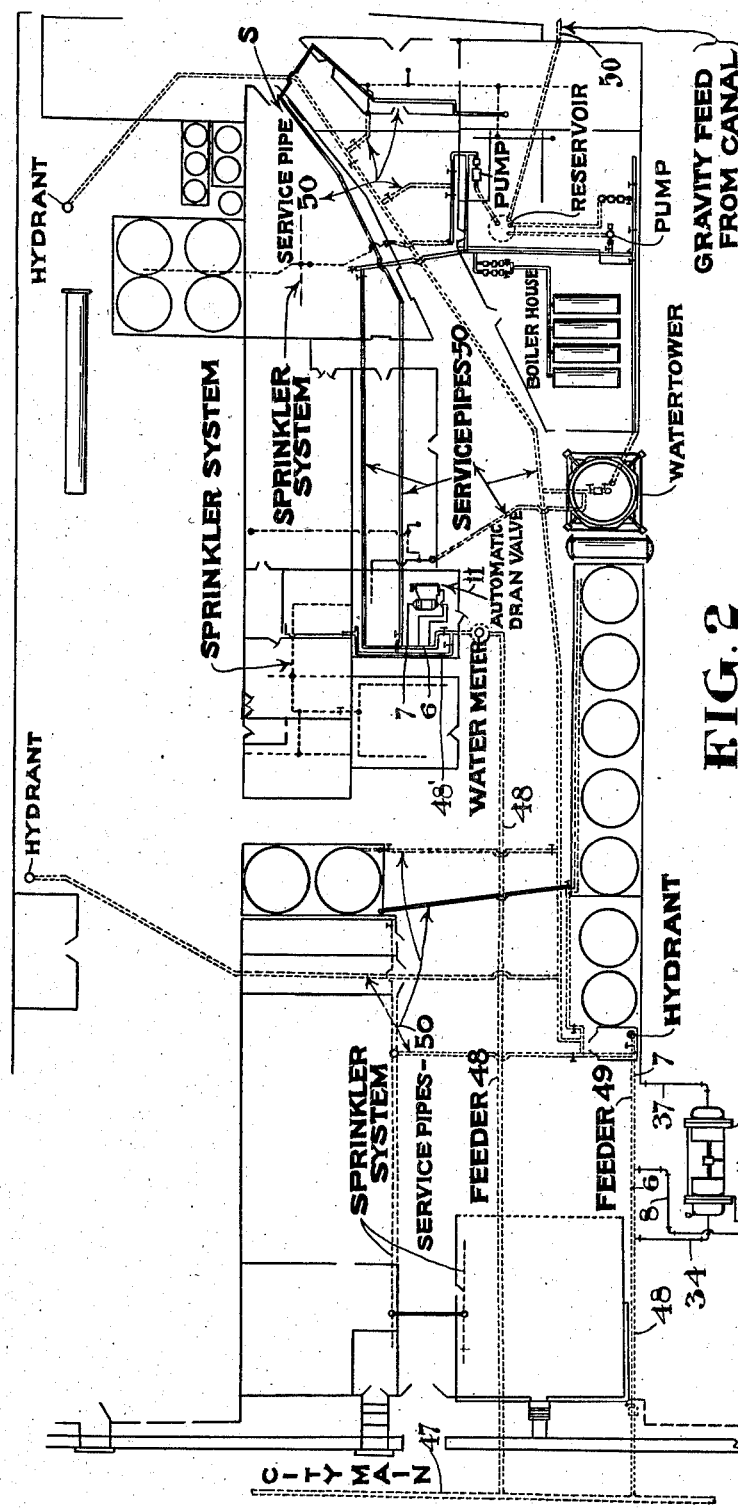
Figure 2 is a schematic view showing the manner in which the check and drain valves provided in accordance with this invention may be installed in a factory or industrial plant water distributing system in which two feeders are employed for supplying city water to service pipes which are also supplied with contaminated water drawn directly from a canal, river or similar source.

In Fig. 2 I have shown my invention embodied in a typical factory fluid distributing system in which a city main 47 is connected, by feeders 48, and 49, to service pipes 50 which are also supplied with canal water through line 50. In this case each of the feeders 48 and 49 is equipped with an automatic drain valve 11 which functions as previously described in connection with Fig. 1.

The branch pipe shown at 48' in Fig. 2 is a drinking water supply pipe and is connected to the main 48 at the upstream side of the check valve 6 so that it is protected by the automatic drain valve 11.

Figure 3:
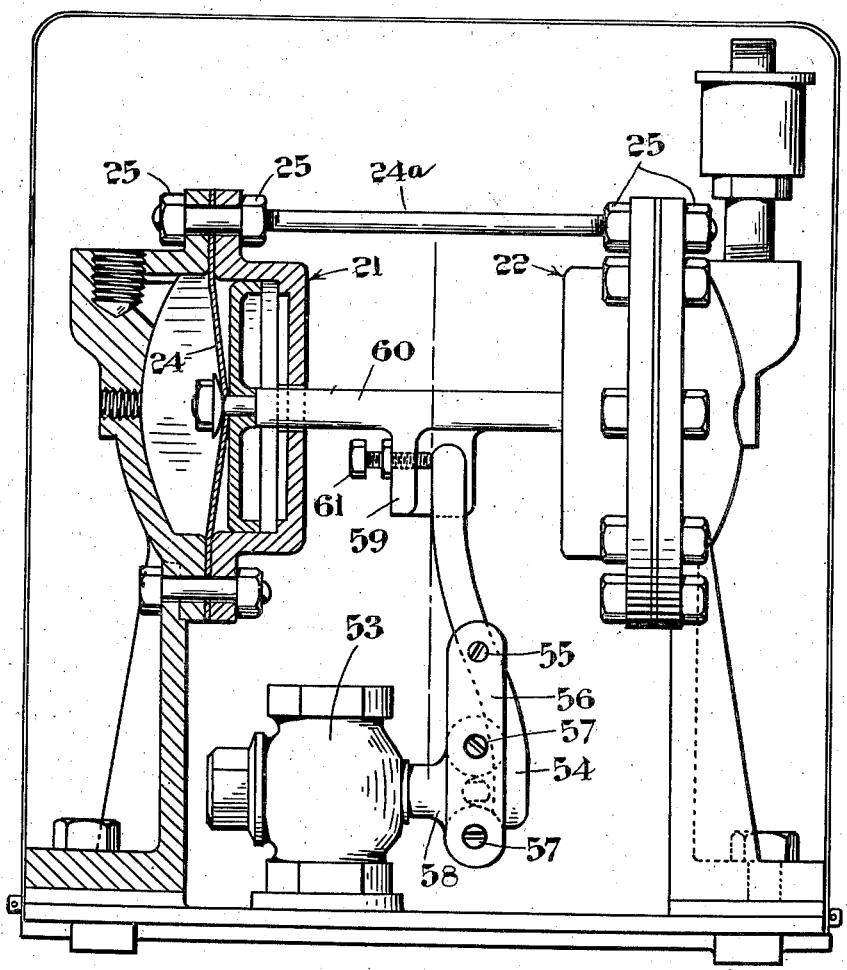
Figure 3 is a view, similar to Fig. 1, but showing a slight modification.

In Fig. 3 I have shown a modified construction in which a conventional spring biased drain valve 53 is employed. In this case the valve opening stem is engaged and moved in a valve opening direction by the lower end of a lever 54. This lever is intermediately pivoted at 55 to a lever holder 56 which, in turn, is fastened by screws or other fastenings 57 to a part 58 of the drain valve. The upper end of lever 54 is fitted in a casing lug 59 depending from the connecting rod 60 and is engaged by a set screw 61. With this arrangement the drain valve 53 is opened and closed in exactly the same manner as described in connection with Fig. 1.

Having thus described my invention, what I claim is:

1. In a fluid distributing system, the combination of a feeder conduit through which water is supplied from a city main to the service pipes of a building, industrial plant or the like, two check valves arranged in said conduit to open when the pressure on the upstream sides of the valves exceeds the downstream pressure and to close when these conditions are reversed, and means for automatically draining fluid from the portion of the conduit lying between the valves when the fluid pressure in said portion of the conduit exceeds the pressure in that portion of the conduit which lies between the main and the check valve nearest said main.

2. A system as set forth in claim 1 wherein said draining means ceases to function when a definite fluid pressure is established between the check valves and is equalized with the pressure in that portion of the conduit lying between the main and the nearest check valve.

3. A fluid distributing system as set forth in claim 1 wherein said draining means comprises a pressure responsive drain valve which opens automatically whenever the pressure between the check valves and that portion of the feeder which lies between the check valves and the city main is at zero value or whenever the fluid pressure between the check valves exceeds the fluid pressure in that portion of the feeder which lies between the main and the nearest check valve.

4. A fluid distributing system as set forth in claim 1 wherein said draining means comprises a pressure responsive drain valve which opens automatically whenever the pressure between the check valves and the pressure in that portion of the feeder which lies between the check valves and the city main is at zero value or whenever the fluid pressure between the check valves exceeds the fluid pressure in that portion of the feeder which lies between the main and the nearest check valve and means normally biasing said valve to open position, said means serving to permit automatic closing of the valve in response to establishment of a definite fluid pressure between the check valves and that portion of the conduit which lies between the main and the nearest check valve.

5. In a fluid distributing system, the combination of a feeder conduit through which water is supplied from a city main to the service pipes of a building, industrial plant or the like, two check valves arranged in said conduit to open when the pressure on the upstream sides of the valves exceeds the downstream pressure and to close when these conditions are reversed, a drain conduit connected to that portion of the feeder which lies between the check valves, a drain valve controlling said conduit, means normally biasing said valve to open position, a pressure chamber connected to that portion of the conduit which lies between the city main and the nearest check valve, a second pressure chamber connected to that portion of the conduit which lies between the two check valves, pistons working in said chambers, a piston rod connecting said pistons and means rigidly connecting said piston rod to said drain valve, the arrangement being such that the drain valve is opened automatically by the biasing means when the pressure in said pressure chambers is equalized at zero value or when the pressure in the pressure chamber connected to the portion of the conduit lying between the check valves is greater than the pressure in the remaining pressure chamber, said system being also characterized in that the valve is automatically closed against the resistance of said biasing means by the valve closing pressure in the drain conduit when pressure conditions in such pressure chambers are equalized at a pressure above the valve opening pressure of said biasing means.

6. In a fluid distributing system, the combination of a feeder conduit through which water is supplied from a city main to the service pipes of a building, industrial plant or the like, two check valves arranged in said conduit to open when the pressure on the upstream sides of the valves exceeds the downstream pressure and to close when these conditions are reversed, a drain conduit connected to that portion of the feeder conduit which lies between the two check valves, a drain valve controlling said drain conduit, means normally biasing said drain valve to open position, a pair of pistons to which the drain valve is rigidly connected, a separate pressure chamber housing each of said pistons, a pipe connecting one of said pressure chambers to that portion of the feeder conduit which lies between the two check valves, a pipe connecting the remaining pressure chamber to that portion of the feeder conduit which lies between the city main and the nearest check valve, the arrangement being such that the pressure established in said pressure chambers are opposed to each other so that the valve is opened automatically by the biasing means whenever the pressure in said pressure chambers is equalized at zero or whenever the pressure in the chamber connected to that portion of the feeder conduit which lies between the two check valves exceeds the pressure in the remaining pressure chamber, said system being further characterized in that the drain valve is closed automatically by the valve closing pressure in the drain conduit whenever the pressure in the pressure chambers is equalized at a pressure exceeding the valve opening pressure of the biasing means.

7. In a fluid distributing system, the combination of a feeder conduit through which water is supplied from a city main to the service pipes of a building, industrial plant or the like, two check valves arranged in said conduit to open when the pressure on the upstream sides of the valves exceeds the downstream pressure and to close when these conditions are reversed, a drain conduit connected to that portion of the feeder which lies between the check valves, a drain valve controlling said conduit, means normally biasing said valve to open position, a pressure chamber connected to that portion of the conduit which lies between the city main and the nearest check valve, a second pressure chamber connected to that portion of the conduit which lies between the two check valves, pistons working in said chambers, a piston rod connecting said pistons and drain valve controlling means arranged to be actuated by said connecting rod, the arrangement being such that the drain valve is opened automatically by the biasing means when the pressure in said pressure chambers is equalized at zero value or when the pressure in the pressure chamber connected to the portion of the conduit lying between the check valves is greater than the pressure in the remaining pressure chamber, said system being also characterized in that the valve is automatically closed against the resistance of said biasing means by the valve closing pressure in the drain conduit when pressure conditions in such pressure chambers are equalized at a pressure above the valve opening pressure of said biasing means, said closure of the valve being effected by said valve closing means in response to a predetermined movement of said connecting rod.

8. A fluid distributing system as set forth in claim 7 in which the valve actuating means comprises an intermediately pivoted lever having one end disposed to engage and actuate a part connected with the drain valve and the other end arranged to be engaged and actuated by a part carried by said connecting rod.

LUCIEN DORÉ.